(12) United States Patent
Yang (10) Patent No.: US 10,787,948 B2
(45) Date of Patent: Sep. 29, 2020

(54) MUFFLER WITH EASY DISCHARGE OF CONDENSATE

(71) Applicants: Hyundai Motor Company, Seoul (KR); Kia Motors Corporation, Seoul (KR)

(72) Inventor: Young-Dug Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 16/219,612

(22) Filed: Dec. 13, 2018

(65) Prior Publication Data

US 2019/0383198 A1 Dec. 19, 2019

(30) Foreign Application Priority Data

Jun. 19, 2018 (KR) .................. 10-2018-0070376

(51) Int. Cl.
*F01N 1/08* (2006.01)
*F01N 13/08* (2010.01)

(52) U.S. Cl.
CPC ............ *F01N 13/08* (2013.01); *F01N 1/082* (2013.01); *F01N 1/089* (2013.01); *F01N 2470/02* (2013.01); *F01N 2490/06* (2013.01)

(58) Field of Classification Search
CPC .......... F01N 1/082; F01N 1/083; F01N 1/084; F01N 1/089; F01N 3/005; F01N 13/08; F01N 2240/22; F01N 2470/02; F01N 2470/18; F01N 2490/06
See application file for complete search history.

(56) References Cited

U.S. PATENT DOCUMENTS

| 2,084,435 | A | * | 6/1937 | Deremer | ................. | F01N 3/005 181/244 |
| 4,393,956 | A | * | 7/1983 | Tsukui | ................... | F01N 3/005 181/260 |
| 5,563,385 | A | * | 10/1996 | Harwood | ................ | F01N 3/005 181/272 |
| 2014/0054101 | A1 | * | 2/2014 | Zhang | ...................... | F01N 1/02 180/309 |

FOREIGN PATENT DOCUMENTS

DE 2914159 B1 * 10/1980 ............... F01N 1/10
KR 10-2010-0062747 A 6/2010

* cited by examiner

*Primary Examiner* — Audrey K Bradley
(74) *Attorney, Agent, or Firm* — Morgan, Lewis & Bockius LLP (57) ABSTRACT

A muffler with ease discharge of condensate may include a housing formed of a cylinder shape and provided with an end plate at both end portions thereof, at least one baffle disposed in the housing to divide the internal space of housing into a plurality of chambers, an inlet pipe introducing exhaust gas in the housing, an outlet pipe discharging the exhaust gas from the housing the outside, so that the exhaust gas flowed into the inlet pipe flows through the chamber divided in the housing to be discharged through the outlet pipe, a condensate collecting tube disposed along the lower surface of the housing and provided with a passage in which the condensate gathered in the lower surface of the housing is introduced to be flowed and a condensate inducing tube connecting the condensate collecting tube and the outlet pipe.

11 Claims, 9 Drawing Sheets

MUFFLER WITH EASY DISCHARGE OF CONDENSATE

CROSS-REFERENCE TO RELATED APPLICATIONS

The present application claims priority to Korean Patent Application No. 10-2018-0070376, filed on Jun. 19, 2018, the entire contents of which is incorporated herein for all purposes by this reference.

BACKGROUND OF THE DISCLOSURE

Field of the Disclosure

The present invention relates to a muffler reducing an exhaust noise of a vehicle, and More particularly, the present invention relates to a muffler with ease discharge of condensate capable of immediately exhausting the condensate gathered therein when generated.

Description of Related Art

Exhaust gas is finally expelled to the outside through an exhaust line of a vehicle, and a muffler is disposed to control an exhaust sound to be reduced.

Figure 1:
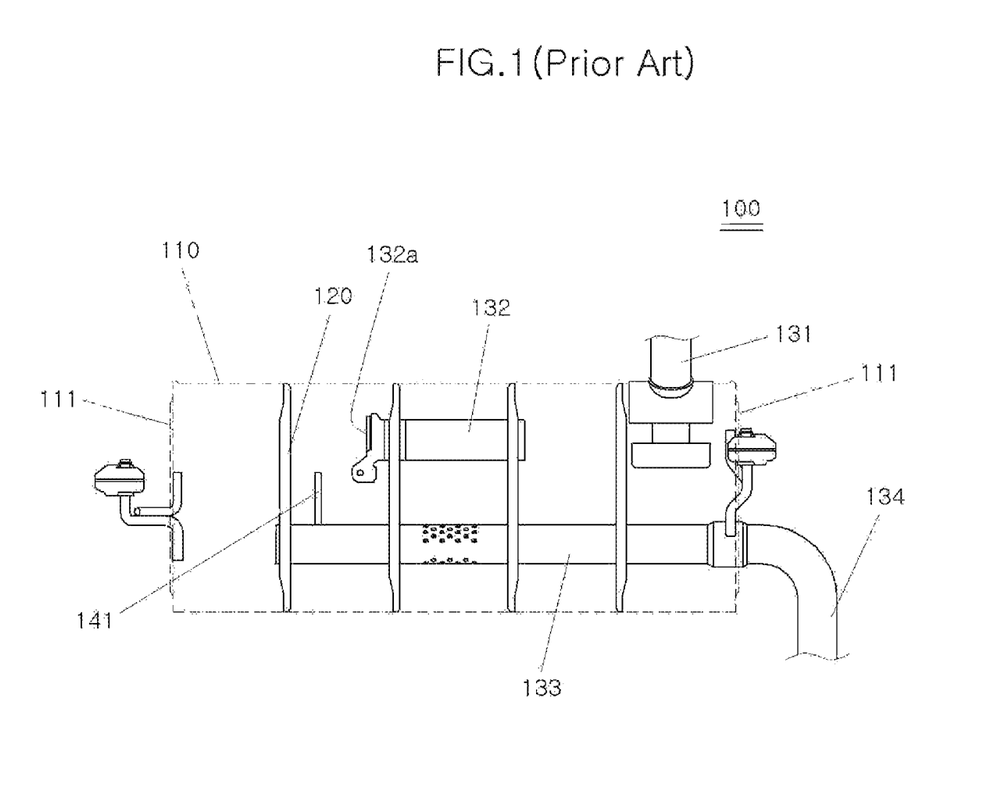
FIG. 1 and FIG. 2 are a top view and perspective view showing a muffler according to the conventional art.
Figure 2:
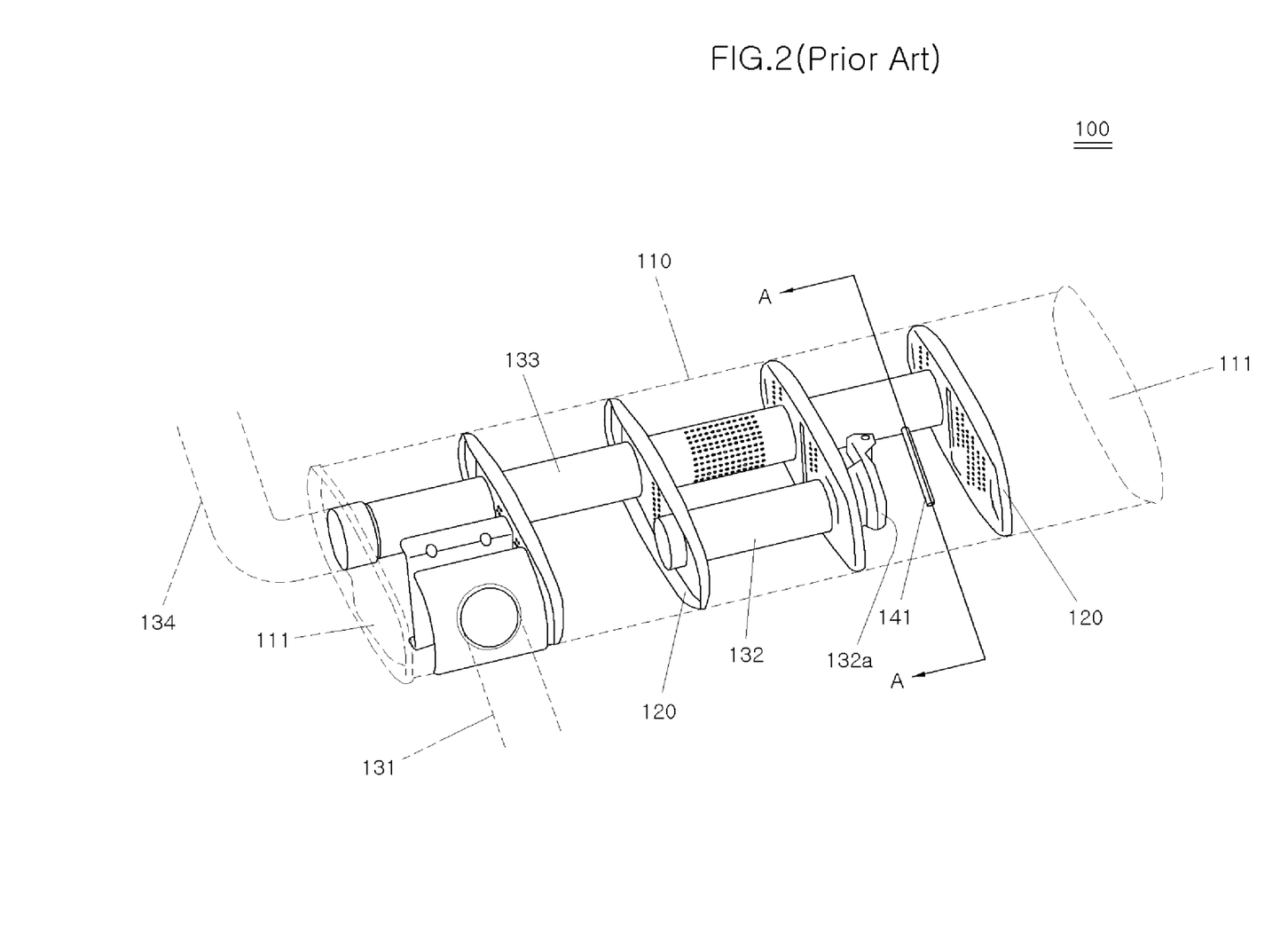

As shown in FIG. 1 and FIG. 2, the muffler includes a housing 110 formed of a cylinder shape and provided with an end plate 111 at both end portions thereof to form a space therein; a plurality of baffles 120 dividing the internal to the housing 110 into a plurality of spaces; an inlet pipe 131 through which exhaust gas flows into the internal to the housing 110; and an outlet pipe 133 which discharges the exhaust gas to the outside of the housing 110 and is connected to a tail pipe 134. A plurality of penetration holes through which the exhaust gas flows, are formed at the baffle 120. Furthermore, a middle pipe 132 is disposed to penetrate the baffle 120. Furthermore, the outlet pipe 133 may be formed to penetrate the baffle 120. A plurality of penetration holes which penetrate the inside and the outside, may be formed at the middle pipe 132 or the outlet pipe 133. An exhaust valve 132a may be provided at the middle pipe 132 so that an exhaust route may be changed depending on an engine speed.

Depending on the specification of the muffler 100 may be changed the number of the baffles 120, the location at which the inlet pipe 131 is connected, the position of the inlet and outlet of the middle pipe 132, the position of the outlet of the outlet pipe 133, the positions where the penetration holes are formed at the middle pipe 132 and the outlet pipe 133.

As the exhaust gas is cooled inside the muffler 100, the moisture contained in the exhaust gas condenses and collects on the bottom portion of the housing 110.

Figure 3:
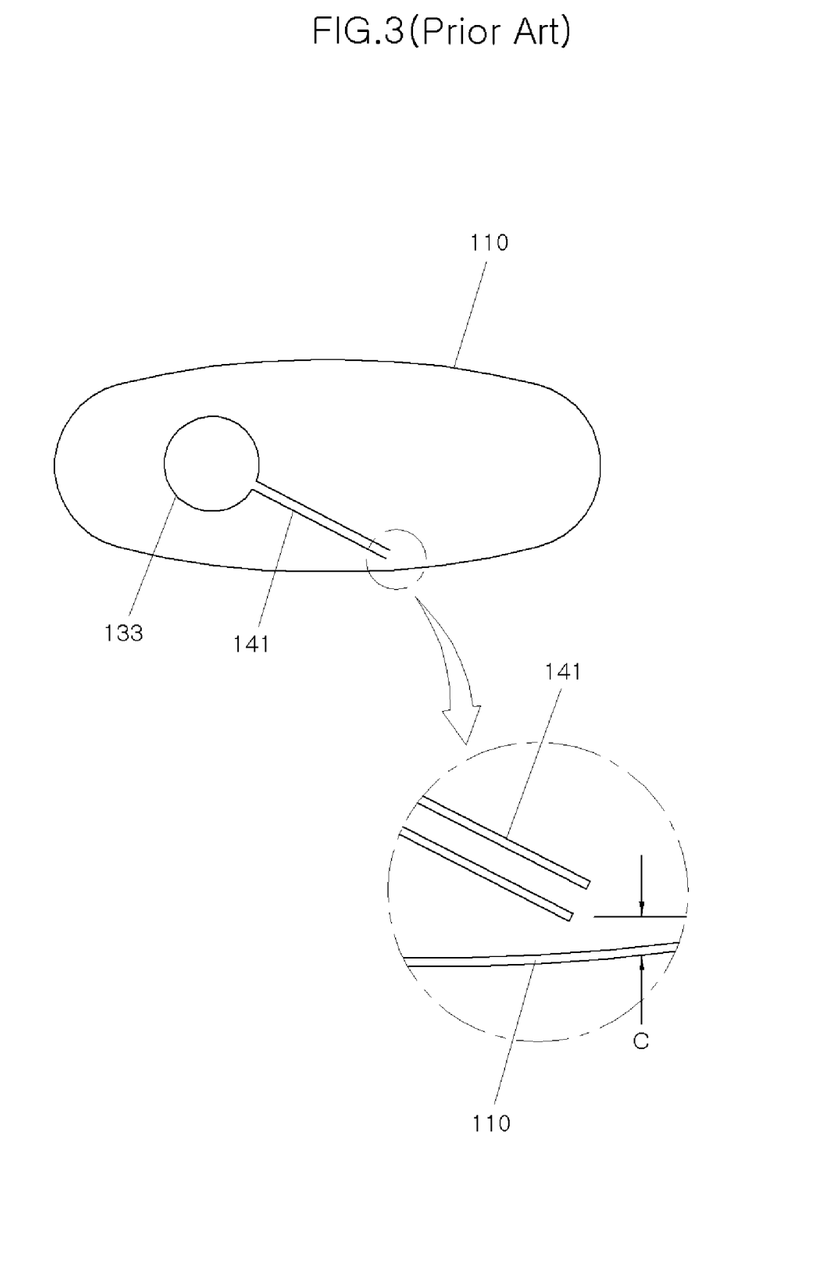
FIG. 3 is a cross-sectional view showing the state where a drain pipe is disposed in the muffler according to the conventional art.
Figure 4:
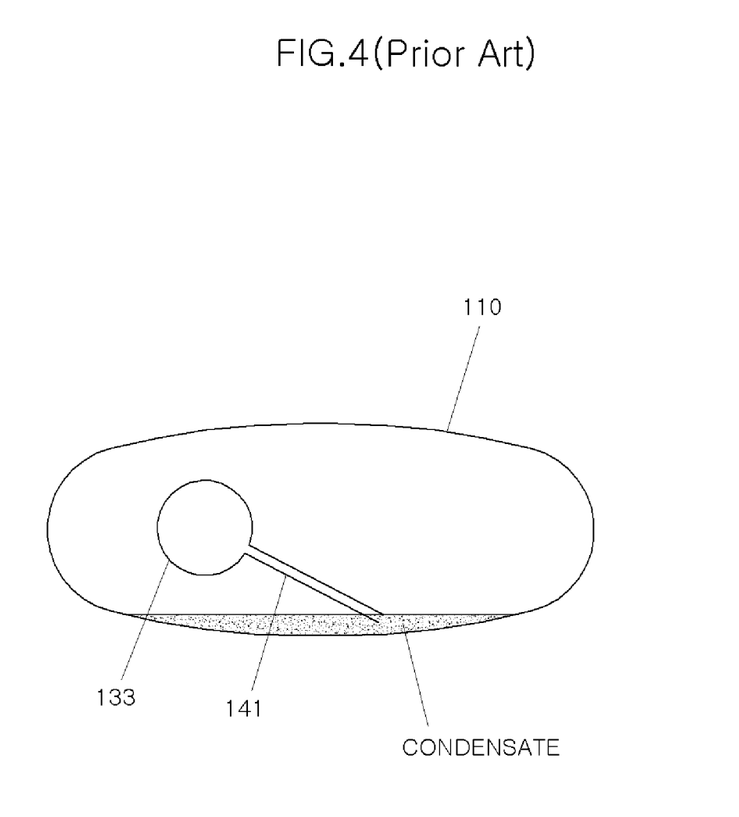
FIG. 4 is a cross-sectional view showing the condensate exhausted through the drain pipe in the muffler according to the conventional art.
Figure 5:
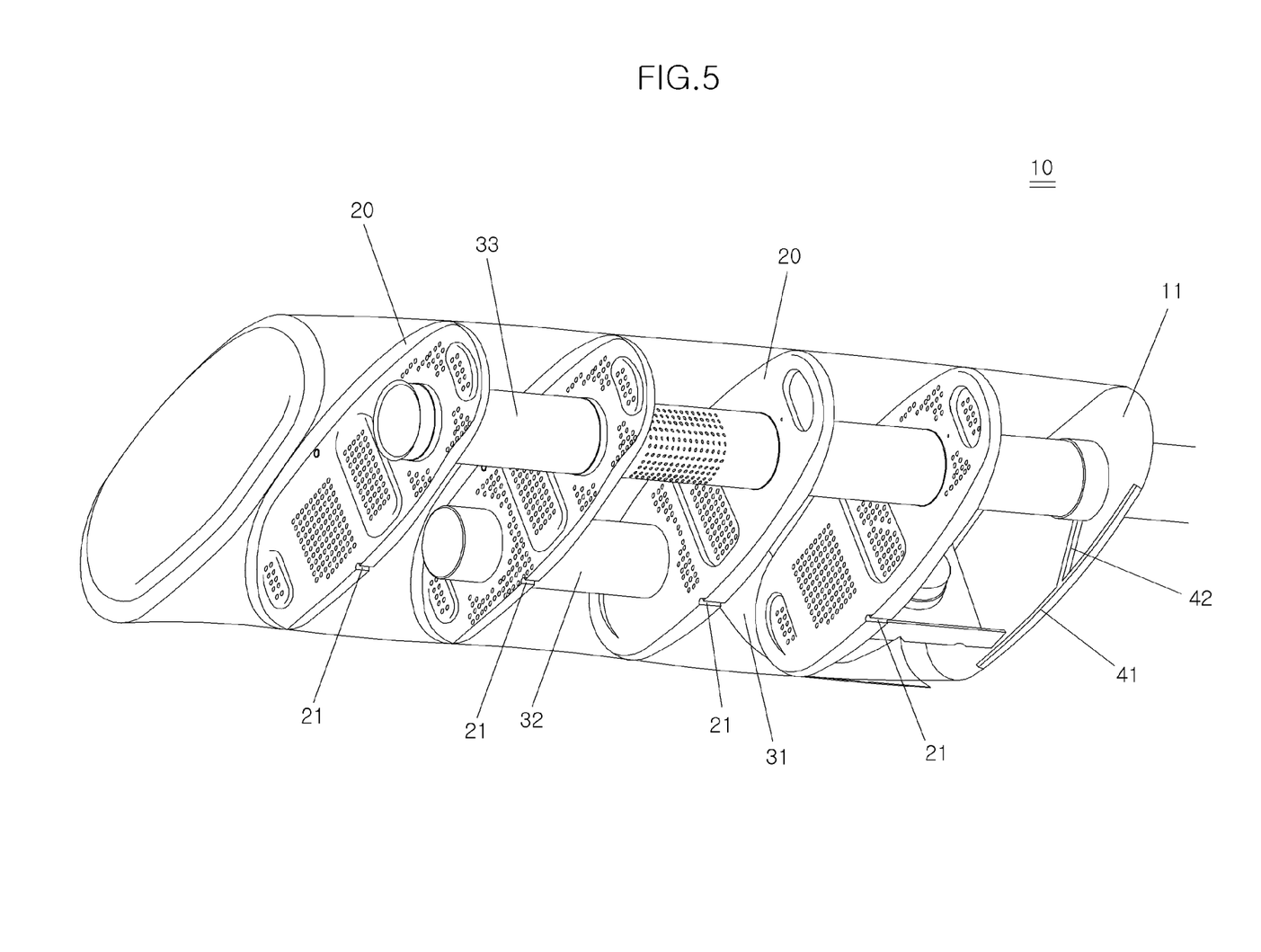
FIG. 5 is a perspective view of the muffler of which a lower surface is cut according to an exemplary embodiment of the present invention.
Figure 6:
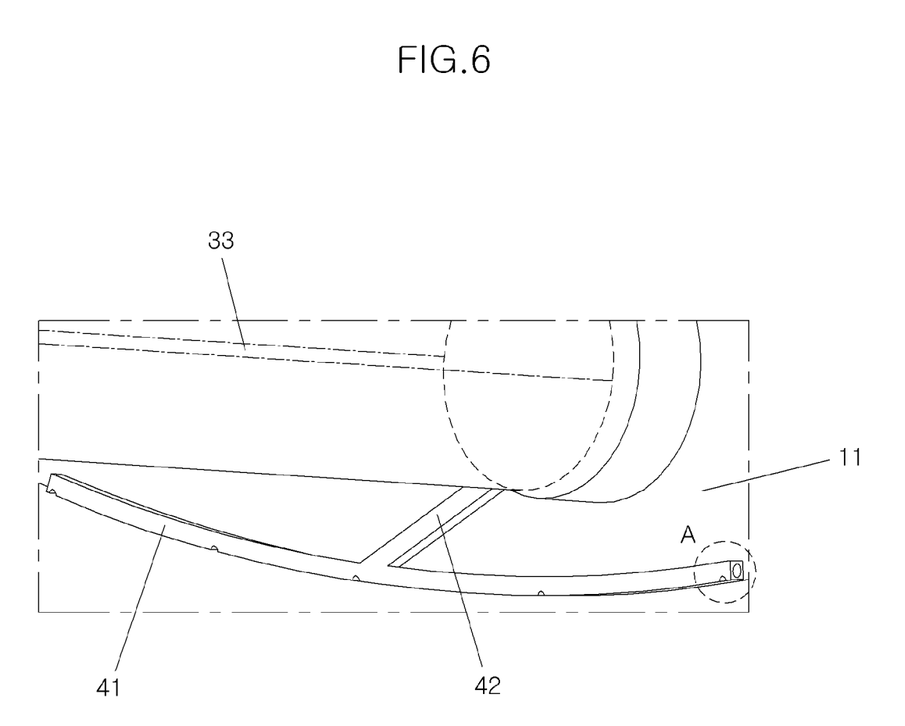
FIG. 6 is an enlarged perspective view of a main portion in FIG. 5.
Figure 7:
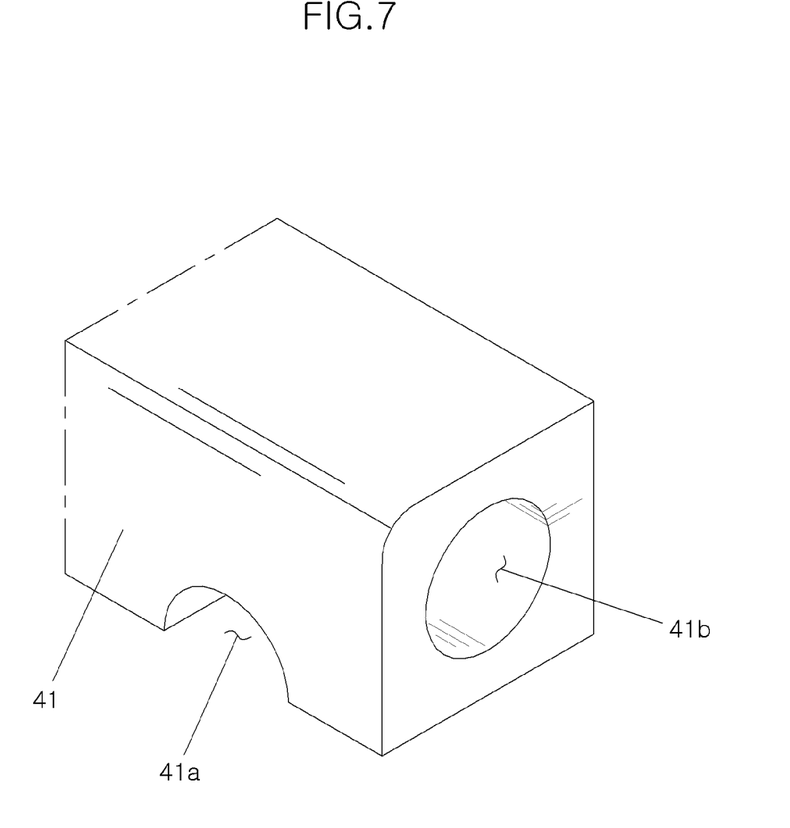
FIG. 7 is an enlarged perspective view of "A" portion in FIG. 6.
Figure 8:
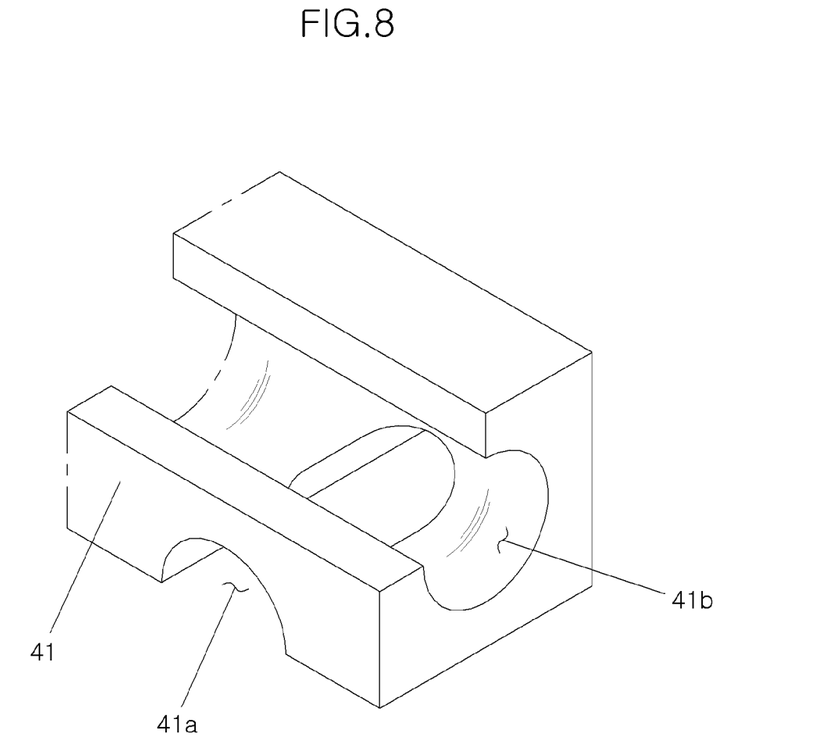
FIG. 8 is a perspective incision view in which the internal to "A" portion in FIG. 6 is cut.

The condensate is expelled to the outside through a drain pipe 141 connected to the outlet pipe 133. As shown in FIG. 3, an upper end portion of the drain pipe 141 is connected to the outlet pipe 133 and a lower end portion thereof is disposed adjacent to the lower surface of the housing 110 with an interval C therebetween.

When the condensate is accumulated inside the housing 110 and the water surface of the condensate becomes higher than the lower end portion of the drain pipe 141, the condensate flows through the drain pipe 141 into the outlet pipe 133 by the exhaust gas flowing through the outlet pipe 133 and exhausted with the exhaust gas. That is, when the exhaust gas is flowing through the outlet pipe 133, the pressure inside the outlet pipe 133 is lowered, and the condensate is drawn in through the drain pipe 141 to be expelled to the outside together with the exhaust gas.

However, according to the muffler according to the related art having the above configuration, the lower end portion of the drain pipe 141 may be spaced apart C to prevent interference between components forming the muffler 100. The lower end portion of the drain pipe 141 is spaced from the lower surface of the housing 110 so that the condensate always condenses inside the muffler 100, causing corrosion of the muffler 100. To prevent this, the material of the muffler 100 may include an excellent corrosion-resistant material, resulting in an increase in cost.

Also, the housing 110 was not formed with a gradient, so that the condensate may reach the constant level, i.e., the lower end portion of the drain pipe 141, to be expelled to the outside.

Furthermore, the moment that the condensate gathered in the lower surface of the housing 110 flows into the drain pipe 141, the condensate flows into the drain pipe 141 together with air, causing inflow noise.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a muffler with ease discharge of condensate configured for immediately exhausting condensate to the outside by gathering the condensate in one place by a gradient when the condensate is generated in the inside.

Various aspects of the present invention are directed to providing a muffler with ease discharge of condensate configured for exhausting the condensate to the outside regardless of the posture of the vehicle.

A muffler with ease discharge of condensate according to an exemplary embodiment of the present invention may include, a housing formed of a cylinder shape and provided with an end plate at both end portions thereof, at least one baffle disposed in the housing to divide the internal space of housing into a plurality of chambers, an inlet pipe introducing exhaust gas in the housing, and an outlet pipe discharging the exhaust gas from the housing to the outside, so that the exhaust gas flowed into the inlet pipe flows through the chamber divided in the housing to be discharged through the outlet pipe in a state of noise being controlled, further including, a condensate collecting tube disposed along the lower surface of the housing and provided with a passage in which the condensate gathered in the lower surface of the housing is introduced to be flowed and a condensate inducing tube connecting the condensate collecting tube and the outlet pipe.

The condensate collecting tube may include a condensate suction hole into which the condensate is flowed from the lower surface of the housing to the internal to the condensate collecting tube; and a condensate collection line formed inside the condensate collecting tube along the condensate collecting tube so that the condensate flowed through the condensate suction hole may be guided toward the condensate collecting tube.

The condensate suction hole may be formed on the lower surface of the condensate collecting tube.

The condensate suction hole may be formed in a plurality at intervals along the longitudinal direction of the condensate collecting tube.

The condensate collection line may be formed inside the condensate collecting tube along the longitudinal direction of the condensate collecting tube.

The condensate collection line may be all communicating with all the plurality of condensate suction holes.

The housing may be sloped so that the portion where the condensate collecting tube is disposed is the lowest portion of the housing.

Each baffle may include a penetration hole formed at one side of the circumference thereof so that the condensate passes through the baffle and moves to another adjacent chamber.

The penetration hole may be formed at the lowest potion of the circumference of the baffle contacting the housing.

The housing may be formed to be sloped so that the lowest portion of the housing is to be the side of the end plate provided at a portion where the outlet pipe and the tail pipe through the exhaust gas is finally discharged are connected to each other.

The housing may be formed in a round shape so that the lower surface of the housing is to be the lowest portion at a middle portion thereof along the forward and backward direction of the vehicle; and the condensate collecting tube may be disposed along length direction of the vehicle.

The condensate collecting tube may be disposed at a portion where the housing and the end plate are contact with each other.

The condensate collecting tube may be disposed to be contacted with the end plate provided at a portion where the outlet pipe is connected to a tail pipe through which the exhaust gas is finally discharged.

The condensate inducing tube may be disposed on the end plate.

In accordance with the muffler with ease discharge of condensate of the present invention having the above-described configurations, a gradient is formed in the lower surface of the housing to collect the condensate to one side and exhaust it to the outside as the condensate is generated.

Also, regardless of the posture of the vehicle, condensate may be expelled to the outside.

As a result, the durability of the corrosion is improved by exhausting the generated condensate immediately to the outside, so that the corrosion resistance against the material of the muffler may be kept low, reducing the material cost.

Furthermore, since the collected condensate is immediately exhausted, no noise occurs when the condensate is exhausted.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To better understand the present invention, exemplary embodiments of the present invention will be explained with reference to the attached drawing. Exemplary embodiments of the present invention may be modified in various forms and the range of the present invention may not be construed as limited to the exemplary embodiments detailed below. The present exemplary embodiments are provided to more fully describe the present invention to those skilled in the art. Thus, the shape, and the like of an element in a drawing may be exaggerated to emphasize a clearer description. It may be noted that the same components in each drawing are denoted by the same reference numerals. Detailed descriptions of known features and configurations which may unnecessarily obscure the gist of the present invention are omitted.

A muffler with ease discharge of condensate according to an exemplary embodiment of the present invention, which includes a housing 10 formed of a cylinder shape and provided with an end plate 11 at both end portions thereof, at least one baffle 20 disposed in the housing 10 to divide the internal space of housing 10 into a plurality of chambers, an inlet pipe 31 introducing exhaust gas in the housing 10, and an outlet pipe 33 discharging the exhaust gas from the housing 10 to the outside, so that the exhaust gas flowed into the inlet pipe 31 flows through the chamber divided in the housing 10 to be discharged through the outlet pipe 33 in a state of noise being controlled, may include a condensate collecting tube 41 disposed along the lower surface of the housing 10 and provided with a passage in which the condensate gathered in the lower surface of the housing 10 is introduced to be flowed, and a condensate inducing tube 42 connecting the condensate collecting tube 41 and the outlet pipe 33.

The housing 10 may be formed of a cylinder shape housing 10 and provided with the end plate 11 at both end portions thereof, respectively, and a space in which the exhaust gas may be flowed is formed inside.

The baffle 20 may be disposed in a plurality of spaced intervals within the housing 10 to divide the internal of the housing 10 into a plurality of spaces, i.e., a chamber in which the exhaust gas resonates. A plurality of penetration holes may be at the baffle 20 so that the exhaust gas can pass through the baffle 20.

As like this, in the state that the internal to the housing 10 is divided into a plurality of chambers, the inlet pipe 31 into which the exhaust gas discharged from engine is flowed may be connected to one chamber among the plurality of chambers. Furthermore, the outlet pipe 33 may be disposed along the longitudinal direction of the housing 10 to penetrate the plurality of chambers. A plurality of penetration holes may be formed at the circumference of the outlet pipe 33 so that the exhaust gas in one or more chambers among the plurality of chambers can penetrate the outlet pipe 33 to flow. Furthermore, a middle pipe 32 may be disposed to cross the baffle 20, and a plurality of penetration holes through which exhaust gas can flow may be formed at the outside of the middle pipe 32.

The exhaust gas flowed into the inlet pipe 31 passes through the plurality of chambers and then is discharged through the tail pipe 34 connected to the outlet pipe 33 while the exhaust sound thereof is controlled.

The specifications of the baffle 20, the middle pipe 32 and the outlet pipe 33 may be set differently for each applicable vehicle. In other words, the number, spacing and number of penetration holes formed in each baffle 20, the arrangement of the chamber in which the inlet pipe 31 is connected, the position of the inlet and outlet of the middle pipe 32, the position of the inlet and outlet of the outlet pipe 33, the location and arrangement of the penetration holes in the middle pipe 32 and the outlet pipe 33 are different for each applicable vehicle.

In an exemplary embodiment of the present invention, the condensate collecting tube 41 introducing the condensate gathered in the lower surface of the housing 10 along the lower surface of the housing 10 to discharge the condensate gather in the housing 10, that is, the lower surface of the internal of the housing, and the condensate inducing tube 42 for sending the condensate flowed into the condensate collecting tube 41 to the outlet pipe 33, may be included.

The condensate collecting tube 41 may be disposed along the lower surface of the housing 10. Since the condensate collecting tube 41 is disposed in close contact with the lower surface of the housing 10, the condensate collected at the lower surface of the housing 10 is immediately exhausted through the condensate collecting tube 41.

At the condensate collecting tube 41 may be formed a condensate suction hole 41a into which the condensate is flowed from the housing 10, a condensate collection line 41b through which the condensate flowed into the condensate suction hole 41a flows into the longitudinal direction of the condensate collecting tube 41.

The condensate suction holes 41a may be formed at intervals along the longitudinal direction of the condensate collecting tube 41. The condensate suction hole 41a may be formed at the condensate collecting tube 41 at intervals along the longitudinal direction of the vehicle, so that the condensate gathered in the lower surface of the housing 10 flows into the condensate suction hole 41a during the acceleration, deceleration, uphill or downhill travel of the vehicle. The condensate suction hole 41a is for exhausting the condensate remaining on the lower surface of the housing 10, so that the condensate suction hole 41a is formed in contact with the lower surface of the condensate collecting tube 41.

The condensate collection line 41b may be formed inside the condensate collecting tube 41 along the longitudinal direction of the condensate collecting tube 41. The condensate collection lines 41b intersect each other at the portions where the condensate suction holes 41a are formed, so that the respective condensate suction holes 41a communicate with the condensate collection line 41b. Accordingly, the condensate flowed into the condensate suction hole 41a flows along the longitudinal direction of the condensate collecting tube 41 in the condensate collection line 41b. Although the condensate collection line 41b is shown as being formed at a higher position than the condensate suction hole 41a, it may be formed at the same height as the condensate suction hole 41a, i.e., at the lower surface of the condensate collecting tube 41.

The condensate inducing tube 42 may be connected at both end portions thereof to the outlet pipe 33 and the condensate collecting tube 41, respectively. The upper end portion of the condensate inducing tube 42 may be connected to the outlet pipe 33 and the lower end portion may be connected to the condensate collecting tube 41. The condensate collected at the condensate collection line 41b can move through the condensate inducing tube 42 to the outlet pipe 33.

In an exemplary embodiment of the present invention, the lower surface of the housing 10 is formed at an angle so that the condensate collects at the lower surface of the housing 10 to the condensate collecting tube 41.

In the housing 10, the lower surface of the housing 10 may be formed to be sloped so that the portion where the condensate collecting tube 41 is disposed may be the lowest portion of the housing 10.

Furthermore, the baffle 20 may have a penetration hole 21 formed therein so that the condensate can move from the internal to the housing 10 to the portion where the condensate collecting tube 41 is formed. For example, at the circumference of the baffle 20, the penetration hole 21 may be formed at the lowest portion of the housing 10 contacting the housing 10, so that the condensate produced in the housing 10 can move to the condensate collecting tube 41 along the lower surface of the housing 10.

Figure 9:
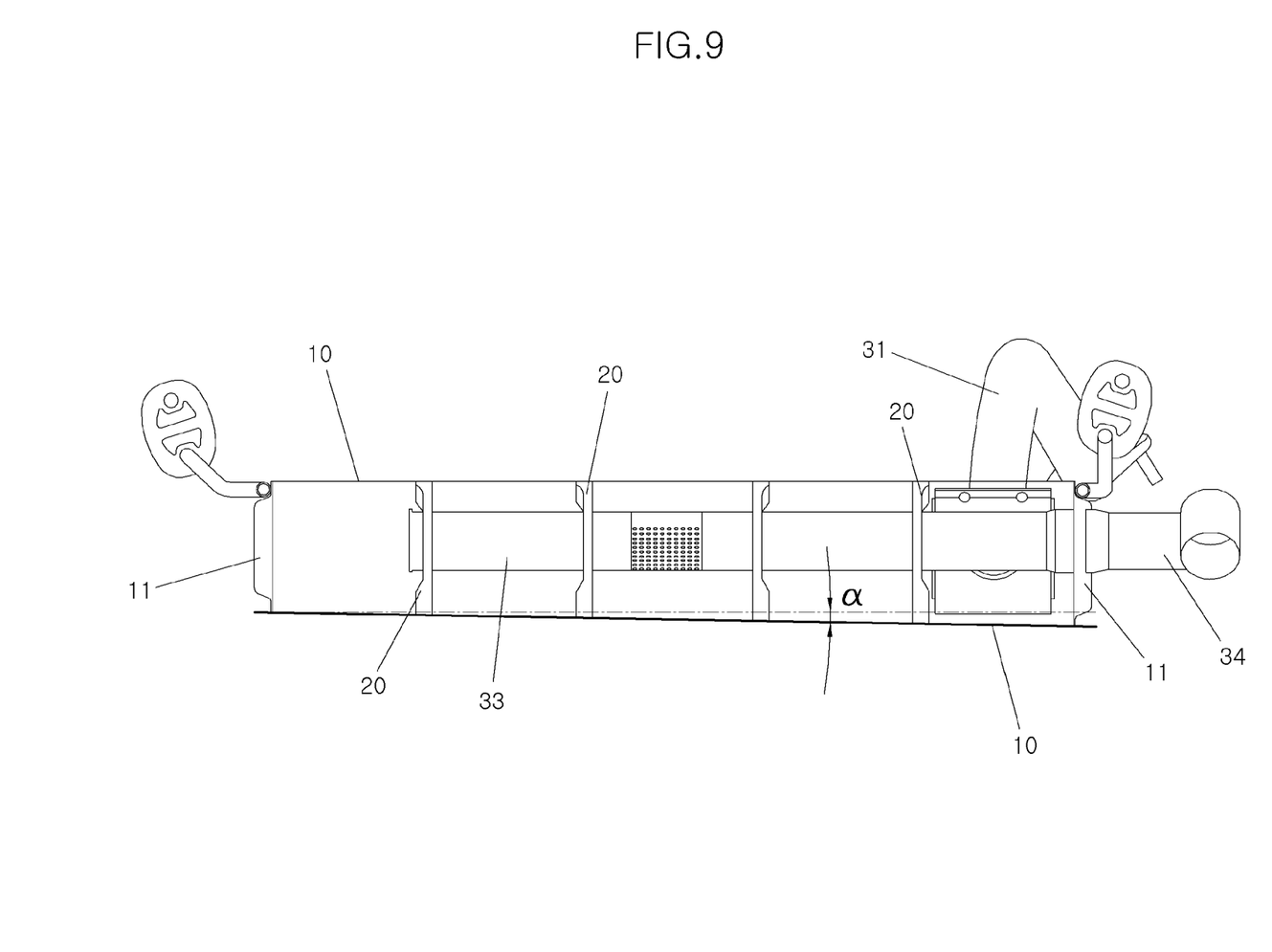
FIG. 9 is a side view of the muffler with ease discharge of condensate according to an exemplary embodiment of the present invention of which a side portion is cut out.

The condensate collecting tube 41 is preferably disposed at the circumference of the end plate 11 at a location where the outlet pipe 33 is connected to a tail pipe 34. The tail pipe 34 may be connected to the outlet of the outlet pipe 33 and is the pipe through which the exhaust gas finally exits from the vehicle. When the condensate collecting tube 41 is formed on the end plate 11 provided at a portion where the outlet pipe 33 and the tail pipe 34 are connected to each other, the lower surface of the housing 10 is formed to be inclined, as shown in FIG. 9. That is, the lower surface of the housing 10 may be formed to be inclined so that the inclination thereof becomes lower toward the end plate 11 on the side where the tail pipe 34 is connected to the end plate 11 from the side where the tail pipe 34 is not connected with. The lower surface of the housing 10 may be sloped to have an inclination angle α so that the condensate generated inside the muffler 1 moves toward the condensate collecting tube 41 along the lower surface of the housing 10.

The condensate moving to the condensate collecting tube 41 is flowed into the condensate suction hole 41a of the condensate collecting tube 41 when the exhaust gas pressure inside the outlet pipe 33 is lowered and then moved through the condensate collection line 41b, through the condensate inducing tube 42 to the outlet pipe 33 and discharged to the outside with the exhaust gas.

Oh the other hand, the lower surface of the housing 10 may be formed in a rounded shape in the width direction of the housing 10 (forward and backward direction of the vehicle). In other words, the lower surface of the housing 10 may have around shape in the forward and backward direction of the vehicle, and is formed at the lowest portion in the middle portion thereof. Accordingly, the condensate collects in the middle of the housing 10 and moves toward the end plate 11 on the side of the tail pipe 34.

Thus, when the vehicle accelerates or decelerates, or even if the vehicle travels uphill or downhill, the condensate travels down the condensate collecting tube 41 along the lower surface of the housing 10. At the instant time, since the condensate collecting tube 41 has the condensate suction hole 41a formed at an interval with respect to the entire section of the condensate collecting tube 41, the condensate may be exhausted regardless of the posture of the vehicle. The condensate may be always discharged through any one the condensate suction hole 41a among of the condensate suction holes 41a formed in the condensate collecting tube 41, while the posture of the vehicle tilts forward (during deceleration or downhill travel) and the vehicle tilts backward (during acceleration or uphill travel).

As described above, since the lower surface of the housing 10 has the lowest portion in contact with the end plate 11 on the side connected to the tail pipe 34, the condensate collecting pipe 41 is provided at a portion where the housing 10 is in contact with the end plate 11 on the tail pipe 34 side thereof. The condensate inducing tube 42 may be also mounted on the end plate 11.

The effect of the muffler with ease discharge of condensate according to an exemplary embodiment of the present invention with the above-described configuration will be described.

When the engine of the vehicle is operated, exhaust gas is flowed into the housing 10 through the inlet pipe 31. The exhaust gas is exhausted through the baffles 20 in the housing 10 or expelled to the tail pipe 34 via the middle pipe 32 or the outlet pipe 33 so that exhaust noise is controlled. Normally, the exhaust noise is controlled to be reduced.

As the exhaust gas is cooled while flowing inside the housing 10, the moisture contained in the exhaust gas is condensed and falls to the lower surface of the housing 10. At the lower surface of the housing 10, the condensate travels along the gradient of the lower surface of the housing 10. For example, in an exemplary embodiment of the present invention, the condensate moves toward the end plate 11 on the side where the tail pipe 34 is connected with.

If the exhaust gas is flowing through the outlet pipe 33, the pressure inside the outlet pipe 33 is lowered due to the speed of the exhaust gas. When the pressure inside the outlet pipe 33 is thus lowered, the condensate flows from the condensate collecting tube 41 to the outlet pipe 33 through the condensate inducing tube 42 by a pressure difference. That is, the condensate is flowed into the condensate collecting tube 41 through the condensate suction hole 41a by the pressure difference. Thereafter, the condensate is led to the outlet pipe 33 through the inducing tube 42 and discharged to the outside of the vehicle together with the exhaust gas.

On the other hand, even if the vehicle is accelerating, decelerating, or moving uphill or downhill to change the posture of vehicle, the lower surface of the housing 10 is formed into a round shape so that the condensate moves forward or rearward of the housing 10. In correspondence to this, the condensate collecting tube 41 is formed and a condensate suction hole 41a is formed at an interval in the condensate collecting tube 41 so that the condensate may be easily discharged even if the condensate moves back and forth inside the housing 10.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A muffler for ease discharge of condensate, the muffler including:
    a housing formed of a cylinder shape and provided with end plates at first and second end portions of the housing and at least one baffle mounted in the housing to divide an internal space of the housing into a plurality of chambers;
    an inlet pipe connected to the housing and introducing exhaust gas in the housing;
    an outlet pipe connected to the housing and discharging the exhaust gas from the housing to an outside of the housing, wherein the exhaust gas flowed into the inlet pipe flows through the plurality of chambers divided in the housing to be discharged through the outlet pipe in a state of noise being controlled;
    a condensate collecting tube mounted along a lower surface of the housing and provided with a passage in which the condensate gathered in the lower surface of the housing is introduced to be flowed therein; and
    a condensate inducing tube connecting the condensate collecting tube and the outlet pipe,
    wherein the condensate collecting tube includes:
        a condensate suction hole into which the condensate is flowed from the lower surface of the housing to the condensate collecting tube; and
        a condensate collection line formed inside the condensate collecting tube along the condensate collecting tube, wherein the condensate flowed through the condensate suction hole is guided toward the condensate collecting tube,
    wherein the condensate suction hole is formed on a lower surface of the condensate collecting tube, and wherein the condensate suction hole is formed in a plurality at intervals along a longitudinal direction of the condensate collecting tube.

2. The muffler for ease discharge of the condensate of claim 1,
wherein the condensate inducing tube is mounted on one of the end plates.

3. The muffler for ease discharge of the condensate of claim 1,
wherein the condensate collection line is formed inside the condensate collecting tube along the longitudinal direction of the condensate collecting tube.

4. The muffler for ease discharge of the condensate of claim 3,
wherein the condensate suction hole is in plural to form a plurality of condensate suction holes, and
wherein the condensate collection line is fluidically-communicated with all the plurality of condensate suction holes.

5. The muffler for ease discharge of the condensate of claim 1,
wherein the housing is formed in a round shape so that the lower surface of the housing is a lowest portion at a middle portion of the housing along forward and backward direction of a vehicle; and
wherein the condensate collecting tube is mounted along a length direction of the vehicle.

6. The muffler for ease discharge of the condensate of claim 5,
wherein the condensate collecting tube is mounted at a portion where the housing and one of the end plates are contact with each other.

7. The muffler for ease discharge of the condensate of claim 6,
wherein the condensate collecting tube is mounted to be contacted with the one of the end plates provided at a portion where the outlet pipe is connected to a tail pipe through which the exhaust gas is discharged.

8. The muffler for ease discharge of the condensate of claim 1,
wherein the housing is sloped so that a portion where the condensate collecting tube is mounted is positioned at a lowest portion of the housing.

9. The muffler for ease discharge of the condensate of claim 8,
wherein each baffle includes a penetration hole formed at a side of a circumference of each baffle so that the condensate passes through the baffle and moves to another adjacent chamber among the plurality of chambers through the penetration hole.

10. The muffler for ease discharge of the condensate of claim 9,
wherein the penetration hole is formed at a lowest potion of the circumference of the baffle contacting the housing.

11. The muffler for ease discharge of the condensate of claim 10,
wherein the housing is formed to be sloped so that the lowest portion of the housing is a side of one of the end plates provided at a portion where the outlet pipe and a tail pipe through the exhaust gas is discharged are connected to each other.

* * * * *